United States Patent
Klein et al.

(10) Patent No.: US 6,558,102 B2
(45) Date of Patent: May 6, 2003

(54) HIGH STORAGE SHELF SYSTEM FOR HANGING GOODS

(75) Inventors: Robert Klein, Pirmasens/Pfalz (DE); Ralf Glänzel, Pirmasens/Pfalz (DE); Lothar Dietz, Hinterweidenthal/Pfalz (DE); Manfred Weber, Pirmasens/Pfalz (DE); Dieter Stümper, deceased, late of Pirmasens/Pfalz (DE), by Bärbel Stümper, legal representative

(73) Assignee: psb GmbH Förderanlagen und Lagertechnik, Pirmasens (DE)

( * ) Notice: Subject to any disclaimer, the term of this patent is extended or adjusted under 35 U.S.C. 154(b) by 0 days.

(21) Appl. No.: 09/738,665

(22) Filed: Dec. 15, 2000

(65) Prior Publication Data

US 2001/0051085 A1 Dec. 13, 2001

Related U.S. Application Data

(63) Continuation-in-part of application No. 09/141,938, filed on Aug. 27, 1998, now abandoned.

(30) Foreign Application Priority Data

Aug. 29, 1997 (DE) .......................................... 297 15 506

(51) Int. Cl.[7] ................................................ B65G 1/04
(52) U.S. Cl. ...................................... 414/282; 414/279
(58) Field of Search ................................ 414/268, 269, 414/270, 277, 279, 280, 281, 282; 211/84.3, 124, 180, 204, 206

(56) References Cited

U.S. PATENT DOCUMENTS

| | | | | | |
|---|---|---|---|---|---|
| 3,184,273 A | * | 5/1965 | Blough | ........................ | 206/292 |
| 3,497,253 A | * | 2/1970 | Gentry, Jr. | ..................... | 294/5.5 |
| 3,741,419 A | * | 6/1973 | Bergerhoff et al. | ......... | 414/282 |
| 3,921,814 A | * | 11/1975 | Solomon | ..................... | 211/124 |
| 4,268,207 A | * | 5/1981 | Pipes | ......................... | 414/277 |
| 4,406,570 A | * | 9/1983 | Duncan et al. | ............. | 414/282 |
| 5,156,513 A | * | 10/1992 | Galen et al. | ................. | 414/277 |
| 5,156,514 A | * | 10/1992 | Zeh | .............................. | 414/278 |
| 5,366,335 A | * | 11/1994 | Tokiwa | ....................... | 414/282 |
| 5,697,508 A | * | 12/1997 | Rifkin et al. | ................ | 206/286 |

FOREIGN PATENT DOCUMENTS

| | | | | |
|---|---|---|---|---|
| DE | 2506587 | * | 9/1975 | |
| DE | 3236997 | * | 4/1984 | |
| DE | 3735607 | * | 5/1989 | ................. 414/277 |
| DE | 3807280 | * | 5/1989 | |

* cited by examiner

Primary Examiner—James W. Keenan
(74) Attorney, Agent, or Firm—Friedrich Kueffner

(57) ABSTRACT

A storage shelf system for hanging goods, for example, a storage system for articles of clothing hanging on clothes hangers, essentially includes a hanging conveyor of the power-and-free type with trolleys traveling on rails, a storage unit, operating devices for loading and unloading the high shelf storage system, and storage rods for receiving the goods during transport and storage thereof, wherein the trolleys, the operating devices, and the high shelf storage system are equipped with supports and corresponding securing devices, such as locking pawls, locking bolts and the like, for securing the storage rods in a positively engaging manner.

20 Claims, 18 Drawing Sheets

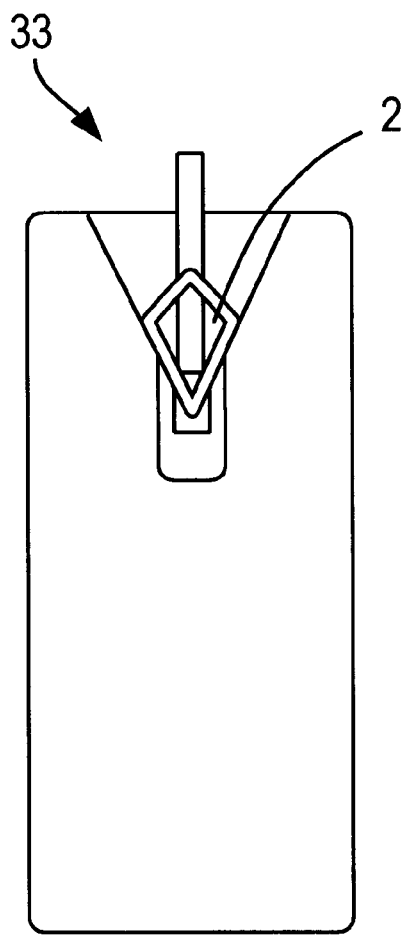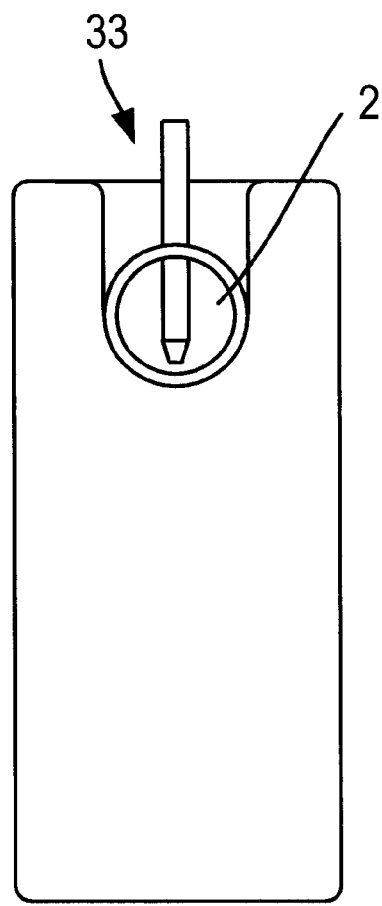
FIG. 11a
FIG. 11b

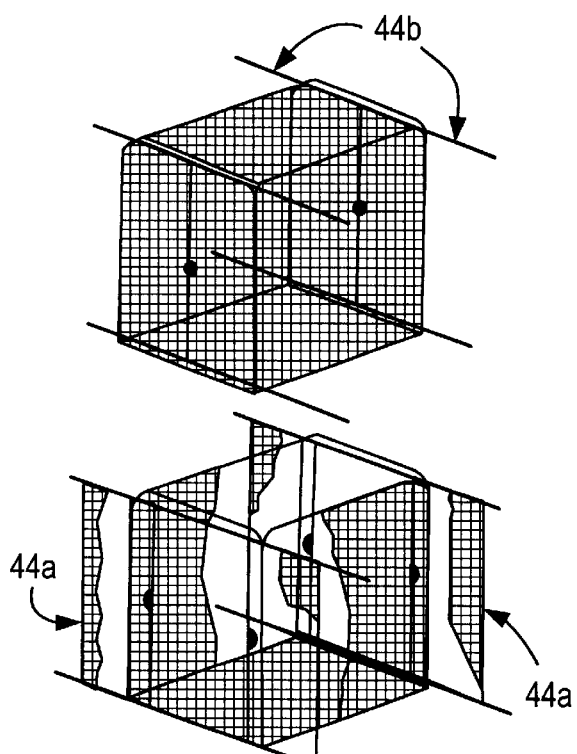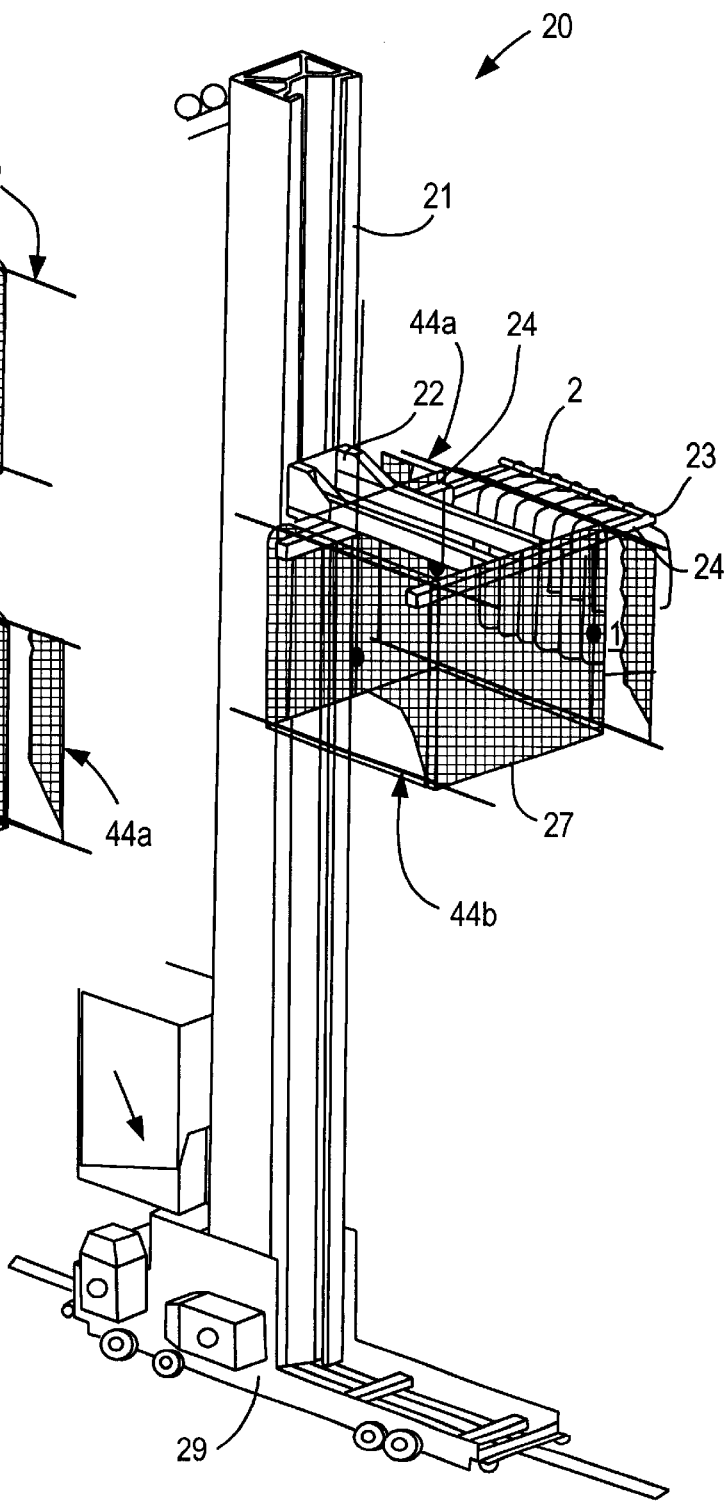

HIGH STORAGE SHELF SYSTEM FOR HANGING GOODS

This application is a continuation-in-part of U.S. application Ser. No. 09/141,938, filed on Aug. 27, 1998, now abandoned.

BACKGROUND OF THE INVENTION

1. Field of the Invention

The present invention relates to a storage shelf system for hanging goods, for example, a storage system for articles of clothing hanging on clothes hangers.

2. Description of the Related Art

During production, in intermediate storage, etc., many goods are transported in a hanging position. This is also true for articles of clothing, for example, coats, jackets, suits, overalls, etc. These items are manipulated in a hanging position during manufacture, during conveyance, in intermediate storage, in final storage and in retail stores. For transporting the articles, so-called hanging conveyor installations in accordance with the power-and-free system have been found useful. An example of such an installation is shown in DE-A 25 06 587. These hanging conveyor installations can be installed on all floors and levels of the manufacturing and storage building. For the actual storage, special buffer lengths are provided in the hanging conveyor installation, wherein the buffer lengths can be coupled to the main conveyor strand by means of switches.

It is also known in the art to transport articles of clothing in bundles on trolleys which are equipped with a support rod. An example of this is shown in DE 38 07 280 C1. The support rod is fixedly mounted on the trolley and can be loaded and unloaded by means of fully automatic units.

The buffer lengths in which the trolleys loaded with the clothing bundles remain until the goods are needed, are usually located in a single plane. Consequently, they require a relatively large storage area. However, in accordance with another commercially available solution, storage in two levels is possible by providing an intermediate platform. The costs of the storage area are lowered accordingly. A stationary vertical conveyor is utilized for transporting the trolleys between the two planes.

SUMMARY OF THE INVENTION

Therefore, it is the primary object of the present invention to provide a storage system equipped with shelves for hanging goods, for example, a storage system for clothing, which has a very high storage capacity and simultaneously permits direct access to the goods.

In accordance with the present invention, the high storage shelf system for hanging goods of the above-described type essentially includes a hanging conveyor of the power-and-free type with trolleys traveling on rails, a storage unit, operating devices for loading and unloading the high shelf storage system, and storage rods for receiving the goods during transport and storage thereof, wherein the trolleys, the operating devices, and the high shelf storage system are equipped with supports and corresponding securing devices, such as locking pawls, locking bolts and the like, for securing the storage rods in a positively engaging manner.

The present invention makes it possible to store hanging goods, for example, clothing hanging on clothes hangers in high shelf storage systems which, as is well known, have the greatest storage capacity over a given area. In this connection, it is possible to utilize the proven components of such a high storage shelf system, i.e., the shelves themselves as well as the operating devices for the shelves. The most important structural elements are the movable storage rods on which the goods remain during the transportation on the hanging conveyor installation and on the operating device and during the storage in the high storage shelf system. Because of the positively engaging supports at the trolleys, the operating devices and the high shelf system, the storage rods can be easily moved by means of mechanical devices. The well-known and proven devices for fully automatically loading and unloading the storage rods can continue to be utilized unchanged.

In accordance with an advantageous further development of the invention, the storage rods are made of pipes having a round to oval cross-section. This type of pipe has been found very useful in practice for a long period of time.

The storage rods may also be of pipes having a polygonal cross-section. These pipes have the advantage that the hooks of hangers rest on the rods at two places, so that the hanger and the goods cannot swing about the upper axis thereof.

Stoppers mounted on the storage rods prevent the goods from sliding. In addition, the stoppers ensure that the ends of the storage rod remain free, so that the manipulating devices can act at those ends without problems.

In accordance with a preferred development of the invention, the supports are constructed as U-shaped or V-shaped prisms. This type of construction is very simple, compensates tolerances without problems and is operationally very safe.

In accordance with a particularly simple development of the invention, the high storage shelf system is composed of posts to which the supports are attached directly. Consequently, if at all, longitudinal struts and transverse struts are only required for reasons of static requirements.

In accordance with a further development, the high storage shelf system is composed of posts and transverse struts, wherein the supports are attached to the transverse struts. In this type of construction, the number of posts may possibly be reduced.

The development mentioned last is particularly advantageous if two or more supports are arranged one behind the other on a storage plane. In that case, the supports are attached to the transverse struts.

In accordance with a further development of the invention, centering devices for exactly positioning the trolleys are provided in the areas of the transfer stations at the high storage shelf system. Depending on the type of centering device, they may be driven by electric motors, pneumatic cylinders and the like.

In accordance with a preferred feature, devices for moving, positioning and/or securing the trolleys are provided in the areas of the transfer stations. Suitable for this purpose are constructions which are known in principle in the prior art and which operate with chains, toothed belts, slides and the like.

In accordance with a further development of the invention, the operating device has at least one telescopic cantilever on which is provided at least one device for holding a storage rod, as well as side shields or protective plates which prevent hooking of the hanging goods, and an integrated sensor system with switches, light barriers, initiators and the like for controlling the fine positioning of the storage rods. Such a telescopic cantilever makes it possible to reach toward the right and toward the left into the storage shelves from the operating device, even when several supports and a storage rods are arranged one behind the other in a storage plane.

In accordance with a first embodiment, the telescopic cantilever includes essentially a base plate which is fastened to the lifting carriage of the operating device, a telescopic frame underneath the base plate, a single or double telescopic pull-out at the telescopic frame, a separately moveable transfer unit mounted on the telescopic pull-out and provided with the devices for holding a storage rod, a drive motor for the telescopic pull-out and a drive motor for the transfer unit. The single telescopic pull-out is sufficient if the storage rods hang with the goods in only one row. On the other hand, if the goods hang in two or more rows one behind the other, the double telescopic pull-out is required.

The separately moveable transfer unit mounted on the telescopic pull-out makes it possible to move the storage rod with the goods hanging thereon always into the middle of the operating device where the goods have the maximum distance to the two adjacent shelves.

In accordance with a further development of the invention, a turntable is provided between the base plate and the telescopic frame, wherein the turntable is rotated by a drive motor. The turntable makes it possible to swing the telescopic cantilever and the transfer unit toward the right or left. It is even possible to receive a storage rod with goods on one side and to turn the storage rod during the travel of the operating device onto the other side, for example, in order to store the storage 8 rod and goods on the other side in an empty shelf section. This accelerates the work sequence decisively.

In order to prevent the transfer unit from damaging or throwing down the goods suspended from a storage rod when a filled storage rod is lifted out of the shelf, centering plates are fastened to the right and left of the transfer unit, wherein the centering plates are shaped or bent in such a way that they form a type of funnel. The devices for holding a storage rod are provided at the centering plates, preferably at the upper edges thereof. The centering plates converge in the downward direction and toward one another and push the goods toward the middle of the storage rod and additionally secure the goods when they are moved in and out and during the travel of the operating device.

In accordance with a second embodiment, the telescopic cantilever is composed of a flat telescopic plate which travels over the storage rods. In that case, hook-type or scissors-type gripping members are provided as supports which grasp the storage rods from above. This embodiment has the advantage that the space above the storage rods is completely free over the entire width of the rod, so that no collisions must be expected with goods which are not entirely correctly hanging on the storage rod.

Since operating devices for shelf systems start up with relatively high acceleration values and decelerate with relatively high deceleration values, the clothing bundles transported on the operating device start to swing. In order to prevent this, so that they do not collide with the shelf system or drop down, a holding and protective device is advantageously mounted on the operating device for securing the goods during the travel of the operating device.

The holding and protective device includes a shutter which can be rolled up easily and, most importantly, in a space-saving manner, as well as a sliding or swinging door which has few moving parts or a protective mesh which may also be mounted fixedly in front of the end faces of the goods. In order to increase the efficiency of the operating device, or when the goods are stored in several rows in order to be able to directly reach the goods hanging in a rear row, it is recommended to provide two or more telescopic cantilevers on the operating device.

The hanging goods may not only be articles of clothing but also, for example, screen or wire mesh boxes. Always one wire mesh box is connected to a support rod, if necessary through an intermediately arranged joint. The wire mesh boxes may be provided with a swinging door and may have storage shelves, so that they can receive goods placed on the storage shelves, wherein the wire mesh boxes are then stored in a hanging position in the high storage shelf system.

In accordance with a recommended feature, an additional telescopic cantilever is provided at the operating device for traveling underneath the wire mesh box when it is placed in the storage shelf and for preventing swinging of the wire mesh box.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 11a shows a support in the form of a V-shaped prism for a polygonal storage rod; and FIG. 11b shows a support in the form of a U-shaped prism for a round storage rod;

FIGS. 12a–12c shows details of a centering plate as used in the arrangement of FIG. 9 in three different views, wherein FIG. 12b shows a side view, FIG. 12a shows a front view, and FIG. 12c shows a section according to the section line indicated FIG. 12b;

FIGS. 13a–13f shows three examples of scissors-type gripping members, one for a round (FIGS. 13a–13b), one for an oval (FIGS. 13c–23d), and one for a polygonal storage rod (FIGS. 13e–13f), wherein FIGS. 13a, 13c, 13e show the gripping members in the open position and FIGS. 13b, 13d, 13f shows the gripping members in the closed position;

FIGS. 15a–15f show three examples of hook-type gripping members, one for a round (FIGS. 15a–15b), one for an oval (FIGS. 15c–15d), and one for a polygonal storage rod (FIGS. 15e–15f), wherein FIGS. 15a, 15c, 15e show the gripping members in the disengaged position and FIGS. 15b, 15d, 15f shows the gripping members in the engaged position;

FIGS. 17a–17c show a protective device for securing the pieces of clothing during movement in the form of a wire mesh box with swinging doors, wherein FIG. 17b shows the swinging doors closed and FIG. 17c shows the swinging doors open;

FIGS. 18a–18c show the protective mesh box with shutters wherein

FIG. 18b shows the shutters closed and

FIG. 18c shows the shutter open; and

FIGS. 19a–19b correspond to the representation of FIG. 8, however, the swinging doors being illustrated in more detail, wherein FIG. 19a shows the doors closed and FIG. 19b shows the doors open.

DESCRIPTION OF THE PREFERRED EMBODIMENTS

Figure 1:
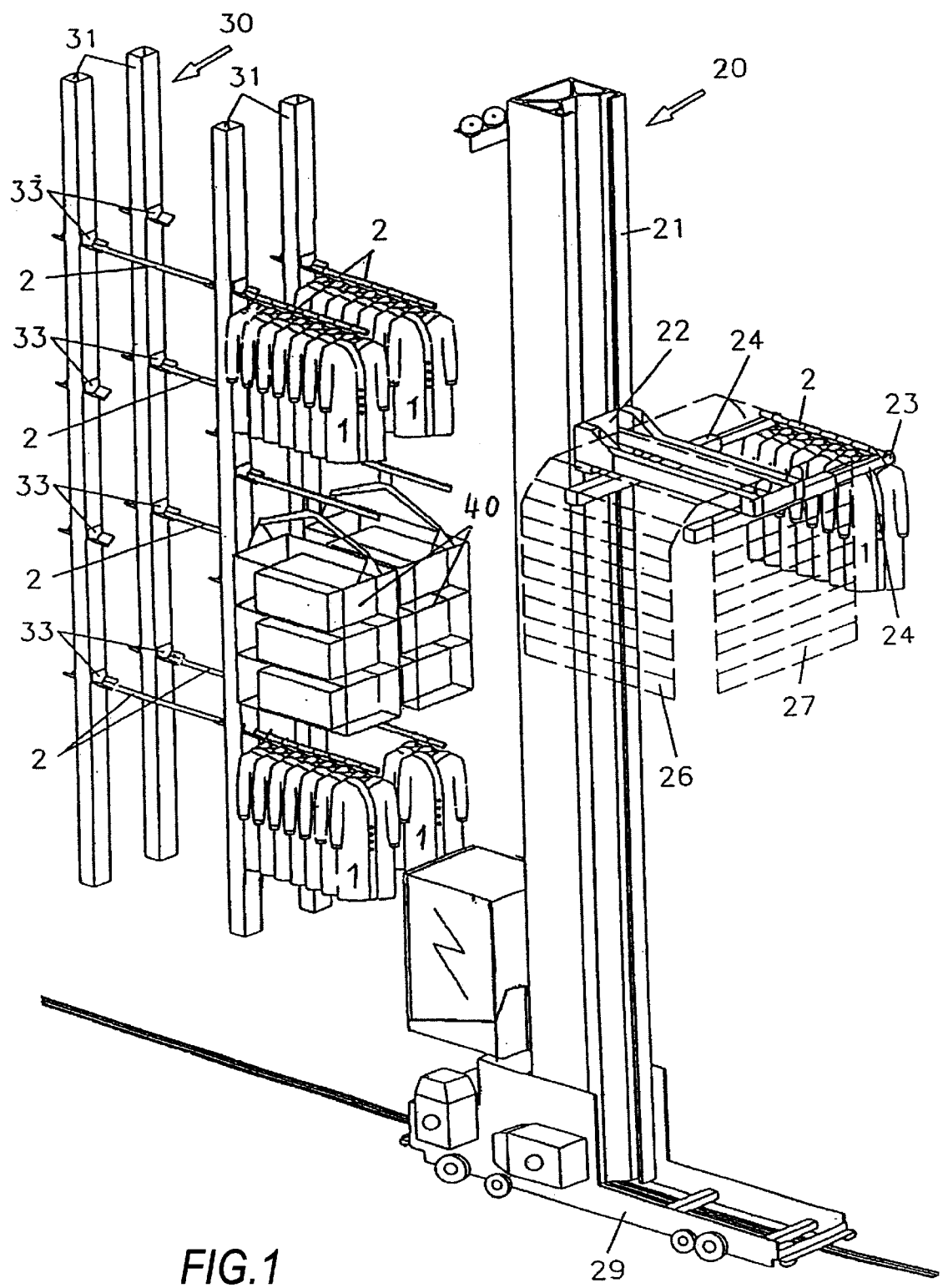
FIG. 1 is a schematic perspective view of a high storage shelf system for hanging goods.

FIG. 1 of the drawing is a schematic and perspective illustration of a section of a high storage shelf system for hanging goods 1, 40. The system includes a high shelf or storage unit 30, for example, with four storage levels. The goods 1, 40 are moved in and out of the shelves by means of an operating device 20 which, as known in the art, travels in the aisle between two storage units 30.

Figure 10A:
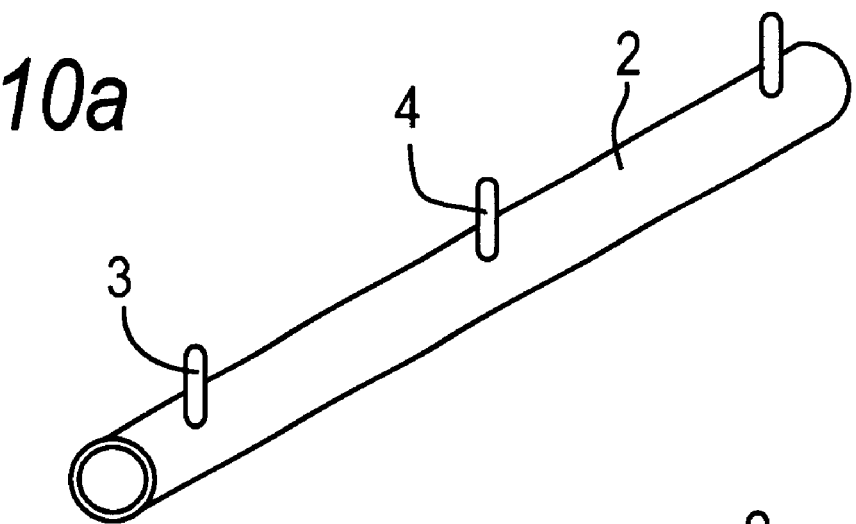
FIGS. 10a–10c show respectively three storage rods with round, oval, and polygonal cross-section, wherein each storage rod has three stoppers.
Figure 10B:
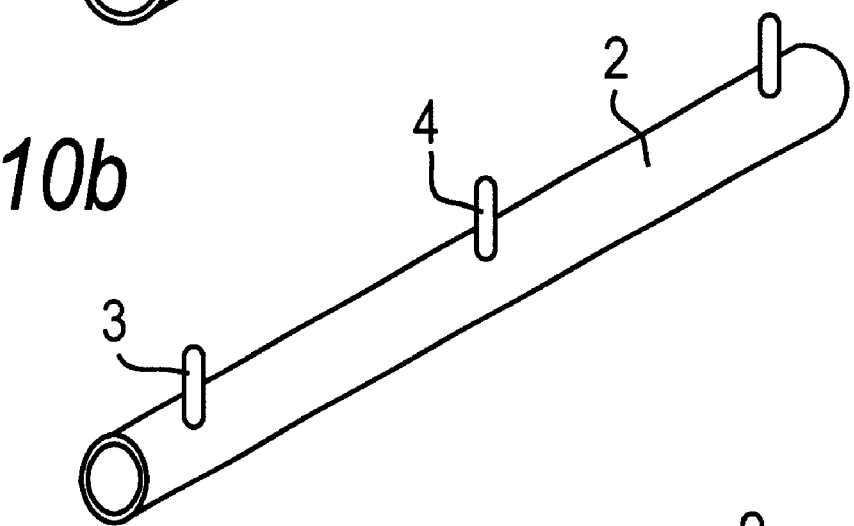
Figure 10C:
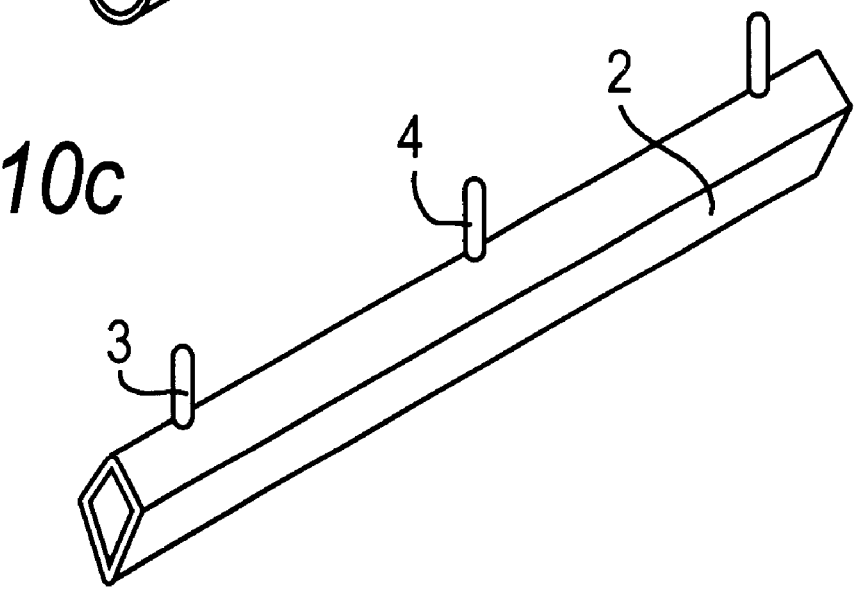

Examples of hanging goods are articles of clothing 1 which hang on hangers on a storage rod 2, and wire mesh boxes 40 which will be explained in more detail in connection with FIG. 8. The goods 1, 40 can remain on the storage rods 2 as long as necessary. The storage rod 2 constitutes the stable element which facilitates handling. The storage rods can have various cross-sectional shapes such as round, oval, and polygonal. Examples are given in FIGS. 10a–10c, also showing stoppers 3, 4 for the hanging goods provided on the storage rods 2.

As illustrated in FIG. 1, the high shelf storage unit 30 is merely composed of posts 31 on which are mounted supports 33 which, in the illustrated embodiment, have the shape of V-shaped prisms (FIG. 11a). The supports can also have a U-shape (see FIG. 11b). If necessary, corresponding securing devices, such as locking pawls, locking bolts and the like may be provided. Longitudinal struts or transverse struts are not necessary, however, they can be provided if statically required.

Figure 1A:
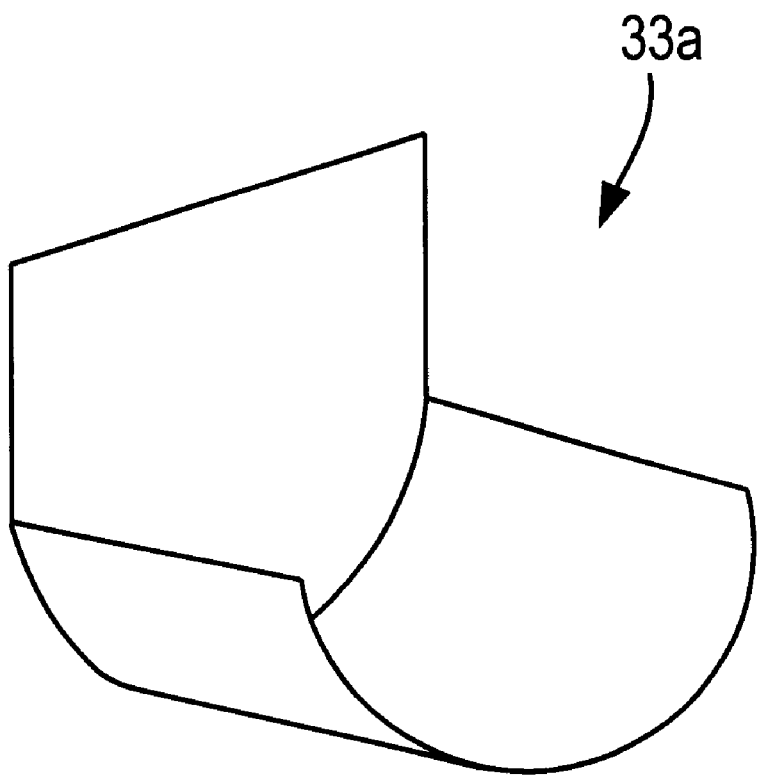
FIG. 1a is a perspective view, on a larger scale, of a prismatic support attached to a storage rod.

FIG. 1a shows a prismatic support 33a whose cross-section is adapted to the storage rods 2 having oval or round cross-sections.

The operating device 20 includes a conventional undercarriage 29 on which is mounted a mast 21 with a lifting carriage 22. Two telescopic arms 24 are mounted on the lifting carriage 22. Provided at the ends of the telescopic arms 24 are supports 23 for a storage rod 2. The support 23 may also be constructed as a V-shaped or U-shaped prism like the supports 33. If necessary, corresponding securing devices, such as locking pawls, locking bolts, may be provided.

To ensure that the goods 1, 40 do not start to swing when the operating device 20 starts and stops and do not collide with the operating device 20 or the high shelf storage unit 30, a holding and protective device is mounted on the lifting carriage 22. This holding and protective device can be composed, for example, of a protective mesh 27 mounted at the end face and lateral shutters 26 which can be rolled up and down. For clarity's sake, the guide means for the shutters and the winding mechanism for the shutters are not shown.

Figure 2:
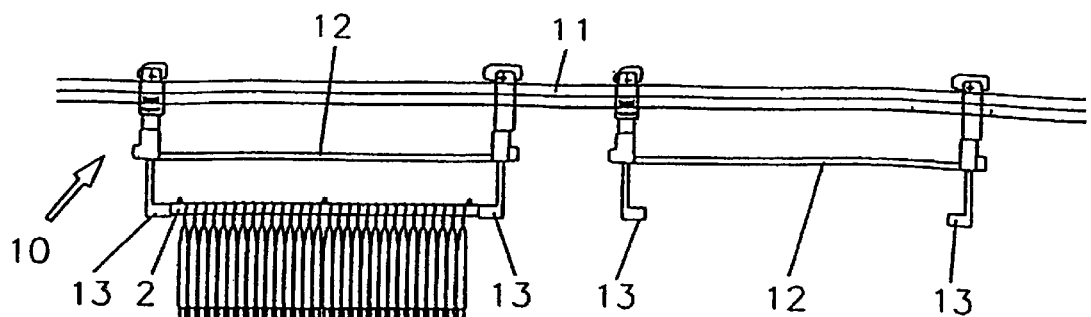
FIG. 2 is a side view, on a larger scale, of a hanging conveyor installation with trolleys.
Figure 7:
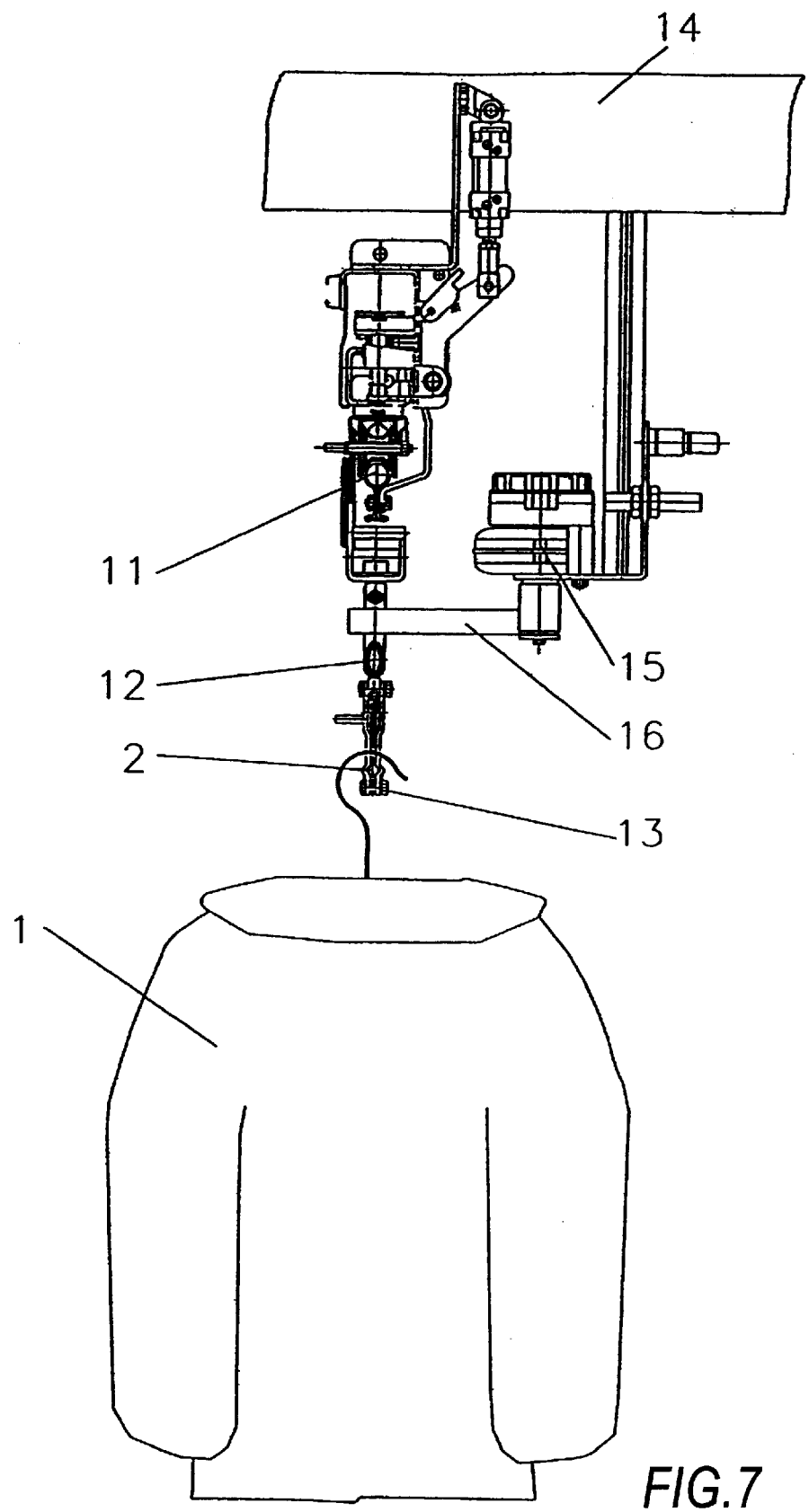
FIG. 7 is a side view, on a larger scale, of a transfer station with positioning and centering device.

FIG. 2 of the drawing shows a portion of a hanging conveyor installation by means of which the goods 1, 40 hanging on the storage rods 2 are supplied to and removed from the operating device 20. This is done at special transfer stations, usually at the front ends of the storage aisles. At these locations, additional side shields or protective plates are provided, as well as an integrated sensor mechanism for controlling the fine positioning of the carriage, as shown in FIG. 7.

Trolleys 12 of conventional construction are suspended from a travel rail 11. The trolleys 12 are provided with supports 13, for example, again in the shape of V-shaped or U-shaped prisms, in which a storage rod 2 can be placed.

Figure 3:
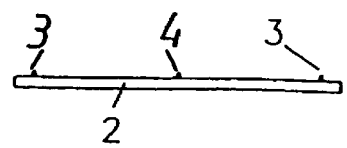
FIG. 3 is a top view of a storage rod.

FIG. 3 shows an empty storage rod 2. Stoppers 3 are provided on the upper side of the rod 2 on the left and right thereof. These stoppers 3 ensure that the ends of the storage rod 2 remain free and that the goods 1 do not slide off. Another stopper 4 in the middle of the storage rod 2 prevents the goods 1, 40 from sliding when the storage rod 2 is only partially filled.

Figure 4:
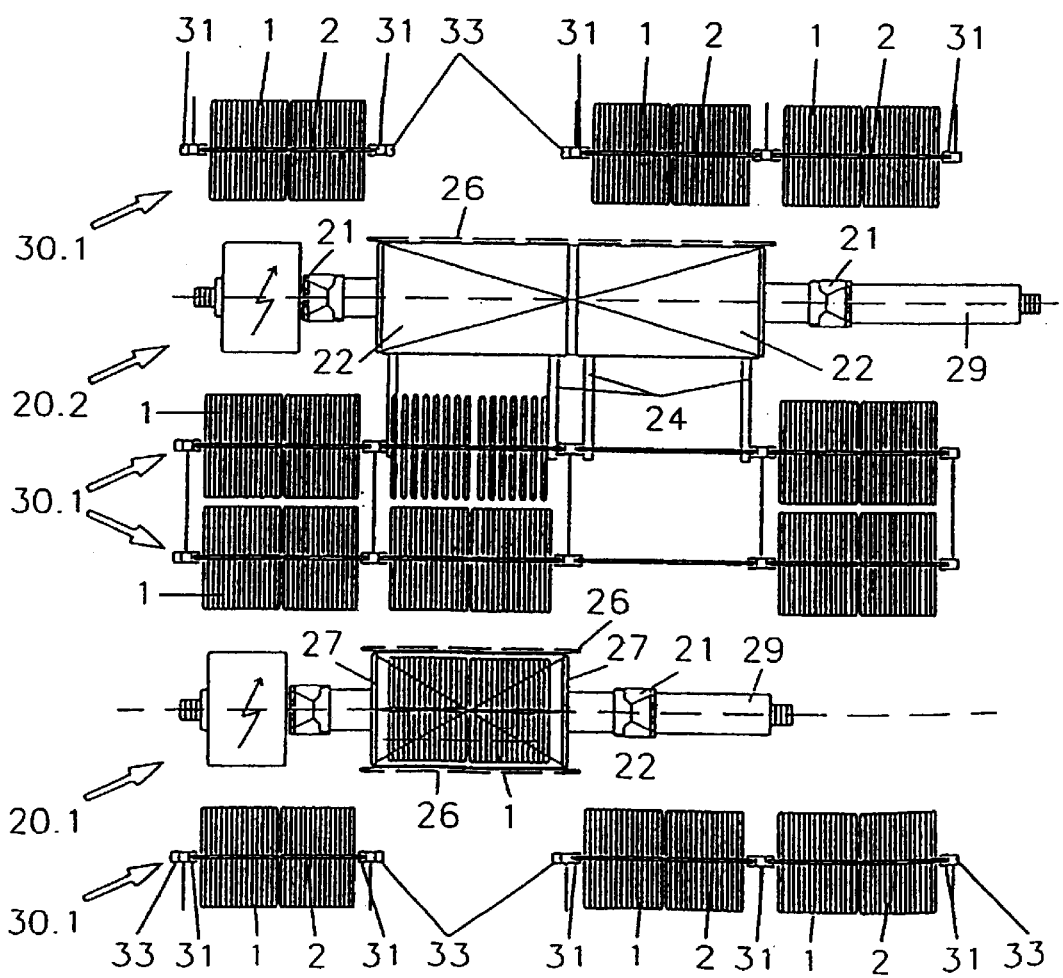
FIG. 4 is a top view of a portion of a high storage shelf system for goods hanging on clothes hangers.

FIG. 4 is a top view of a high storage shelf system with a single-row placement of goods 1. FIG. 4 shows the posts 31 and the prismatic supports 33 which are attached to the posts 31 and hold the storage rods 2 in a positively-locking manner. Operating device 20.1, 20.2 travel in the aisles between two high shelves 30.1, respectively. The operating device 20.1 traveling in the lower aisle only has one lifting carriage 22 which is loaded with bundles 1 of goods. The shutters 26 of the holding and protective devices 26, 27 are rolled down and thus "active", i.e., they protect the hanging goods during transport.

The operating device 20.2 traveling in the upper aisle has two lifting carriages 22 each provided with a pair of telescopic arms 24 for loading and unloading the goods. In the shown illustration, the telescopic arms 24 are extended in order to move storage rods 2 in or out. The shutters 26 are rolled up and inactive, i.e., their protective function is canceled momentarily.

Figure 5:
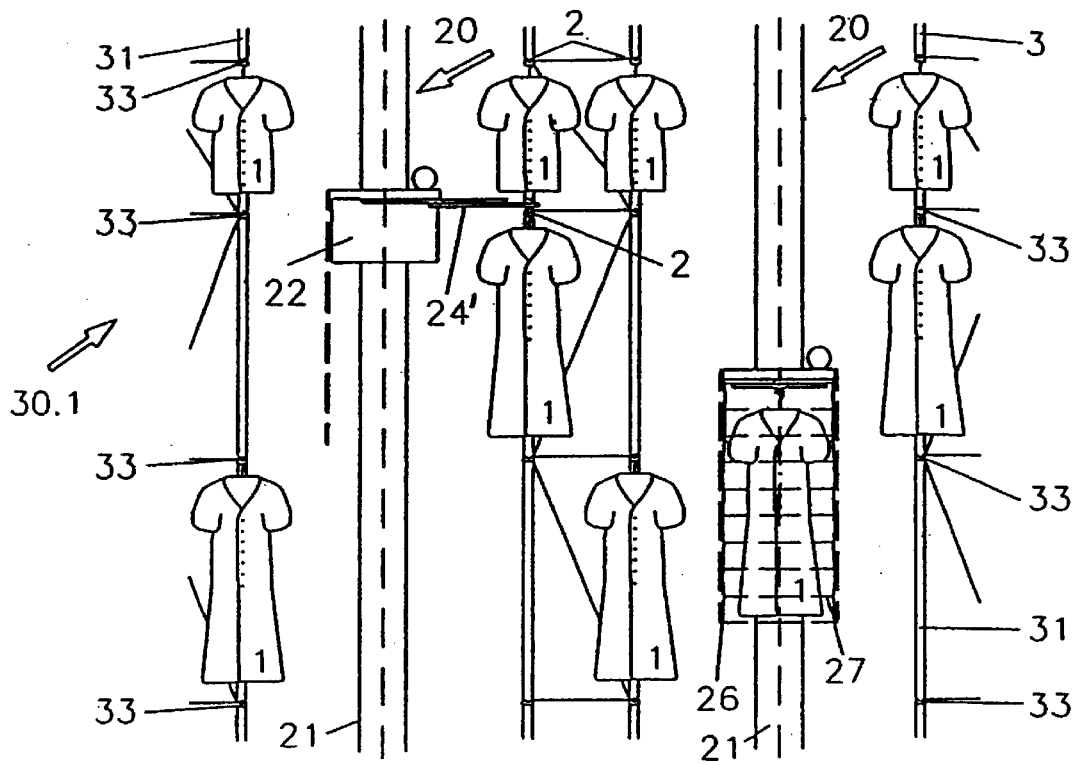
FIG. 5 is a front view of a single-row high storage shelf system for articles of clothing.

FIG. 5 is a front view of a portion of another high storage shelf system. Shown are four high shelves 30.1 with the goods 1 being hung in one row and an operating device 20 in each aisle. The operating device 20 traveling in the right aisle is loaded with goods 1. The holding and protective devices 26, 27 are active, i.e., rolled down to protect the goods.

In the operating device 20 traveling in the left aisle, the telescopic cantilever is extended in order to move a storage rod 2 loaded with goods 1 in or out. The telescopic cantilever is composed of a flat telescopic plate 24' which travels over the storage rods 2 and, thus, utilizes the free space between the storage rod 2 and the goods 1 hanging in the next higher storage level. Hook-type (HT, see FIGS. 15a–15ff and 16a–16f for detail) or scissors-type (ST, see FIGS. 13a–13f and FIGS. 14a–14f for detail) gripping members are provided underneath the telescopic plate 24' for gripping the storage rod 2 from above. The scissors-type gripping members are matched, depending on the type of storage rod needed, to a round (FIGS. 13a–13b), an oval (FIGS. 13c–13d), and a polygonal (FIGS. 13e–13f) cross-section of the storage rods.

Figure 13A:
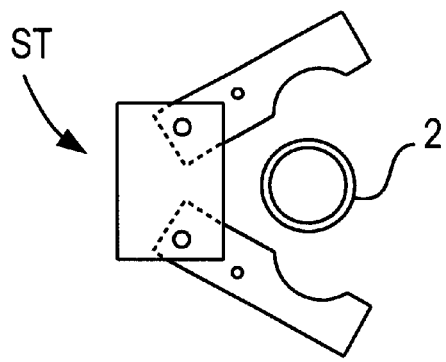
Figure 13B:
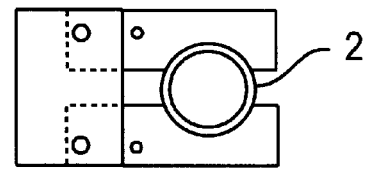
Figure 13C:
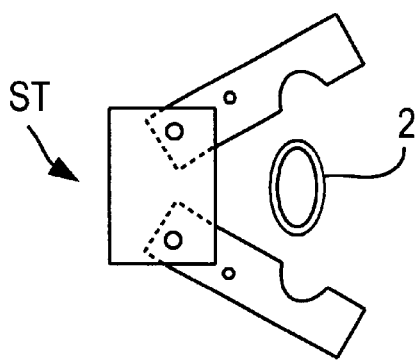
Figure 13D:
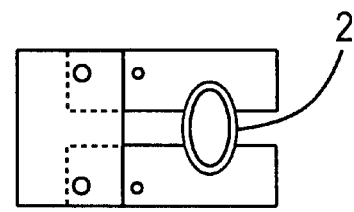
Figure 13E:
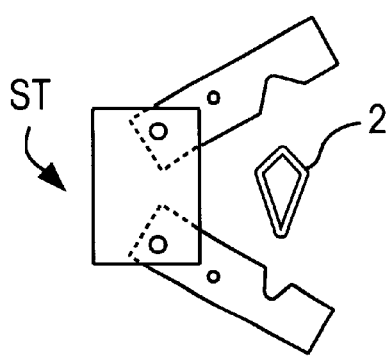
Figure 13F:
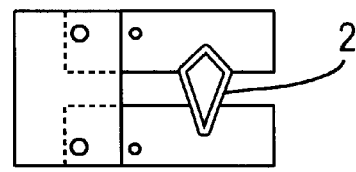
Figure 14A:
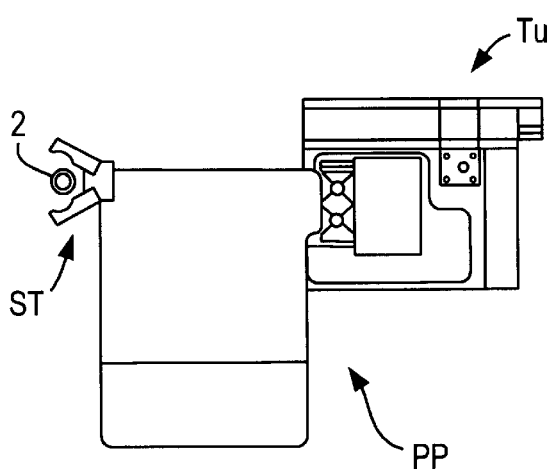
FIGS. 14a–14f show the scissors-type gripping members of FIGS. 13a–13f in operation, wherein the large rectangular surface on which the gripping members are supported is a protective support for the articles of clothing suspended from the storage rod during movement.
Figure 14B:
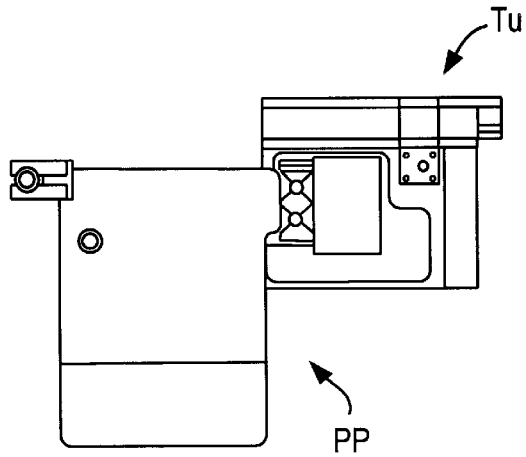
Figure 14C:
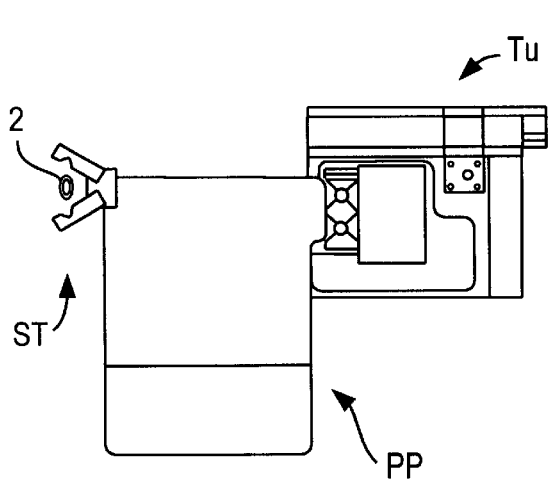
Figure 14D:
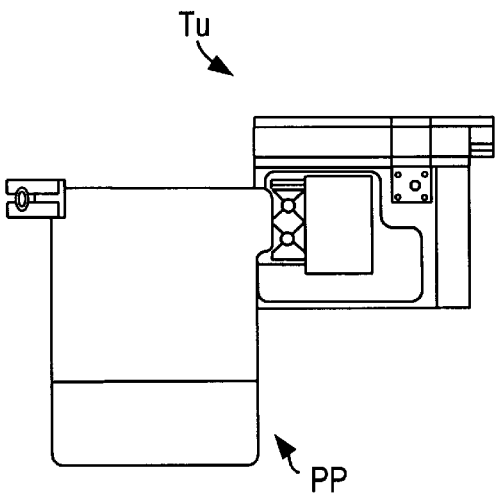
Figure 14E:
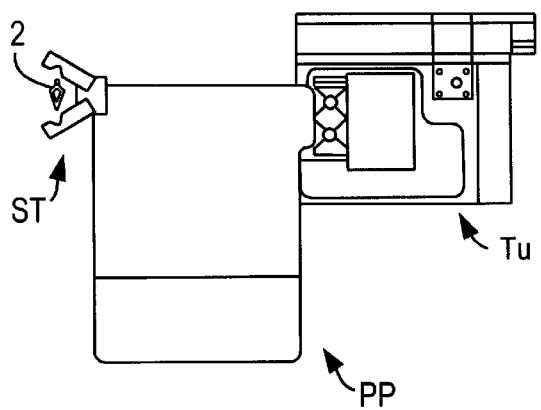
Figure 14F:
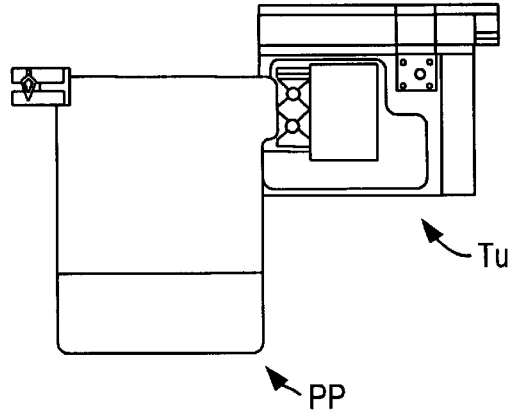
Figure 15A:
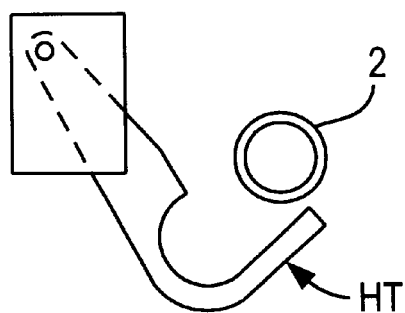
Figure 15B:
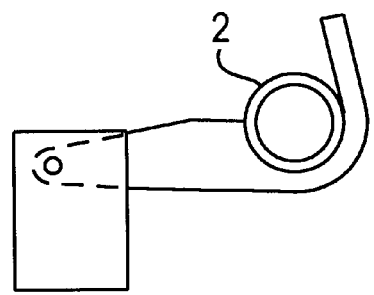
Figure 15C:
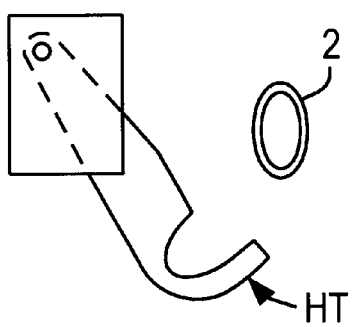
Figure 15D:
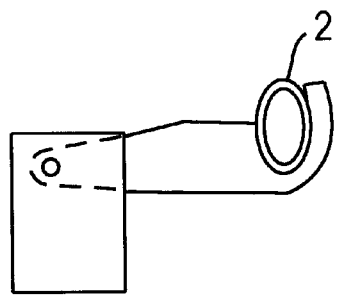
Figure 15E:
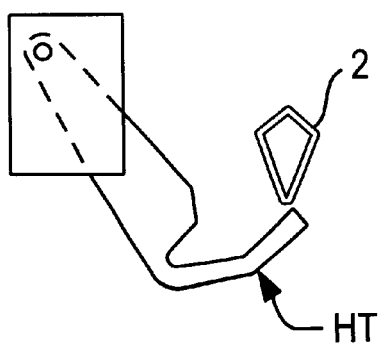
Figure 15F:
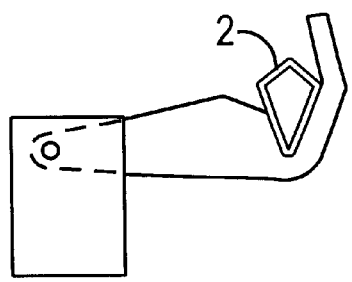
Figures 16A, 16B:
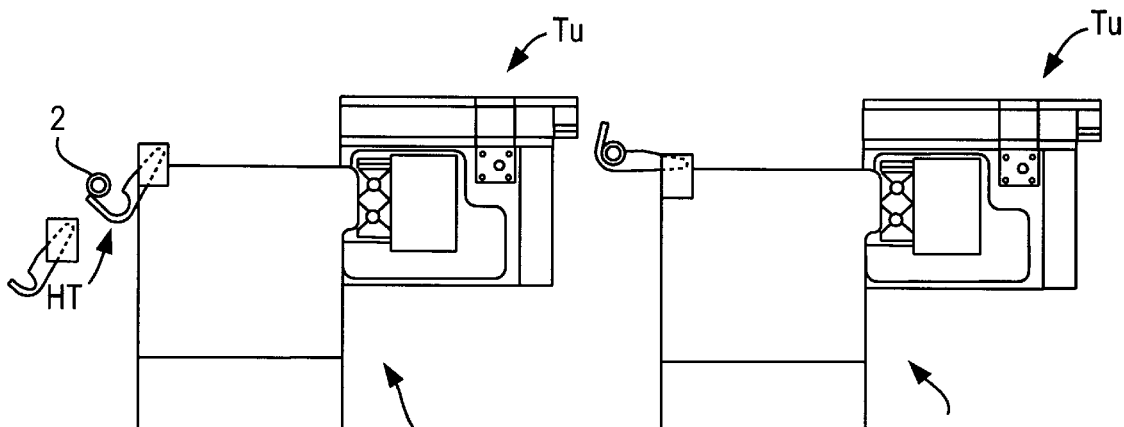
FIGS. 16a–16f show the hook-type gripping members of FIGS. 15a–15f in operation, wherein the large rectangular surface on which the gripping members are supported is a protective support for the articles of clothing suspended from the storage rod during movement.
Figures 16C, 16D:
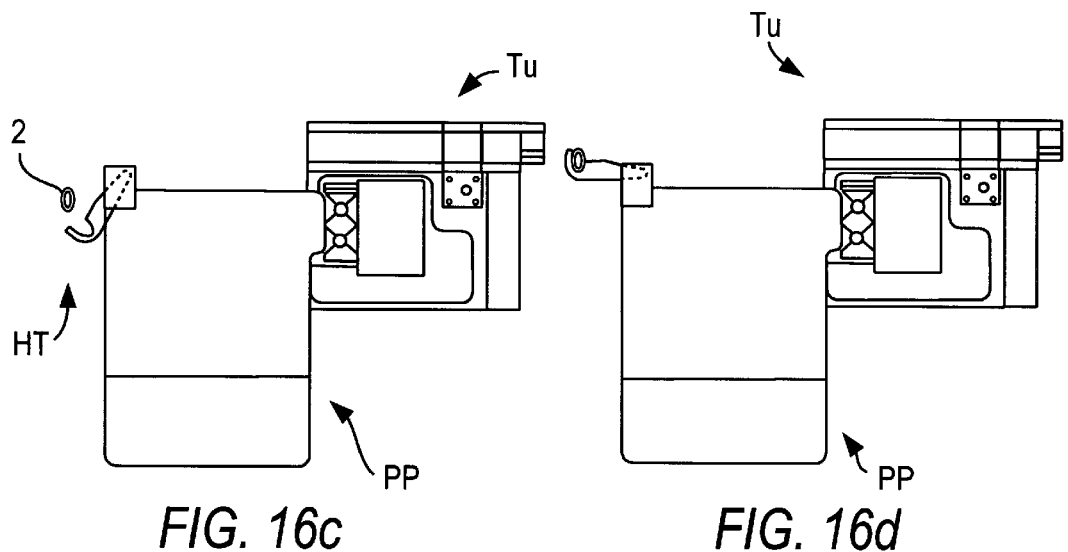
Figures 16E, 16F:
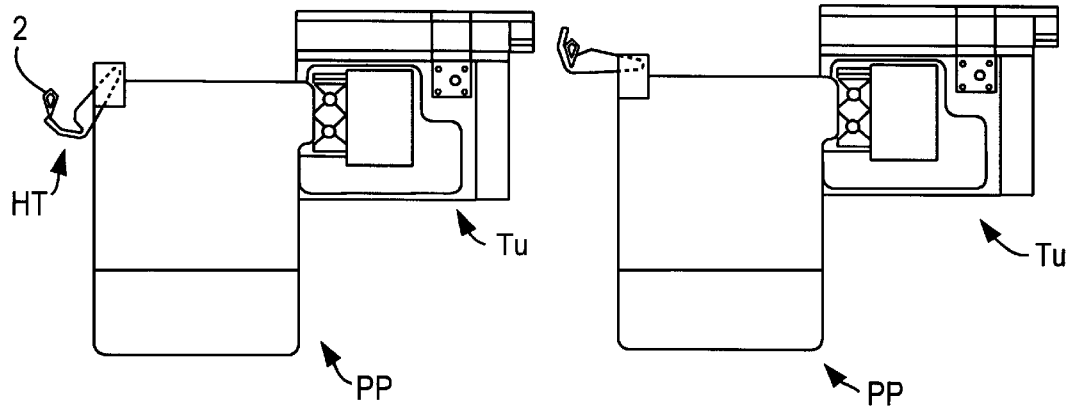

The FIGS. 13a, 13c, 13e show the gripping members ST in the form of a scissor mechanism, comprised of an upper member and a lower member pivotably connected to a support and moveable toward and away from one another, in the open position ready to receive a storage rod 2 or after just releasing a storage rod 2, and FIGS. 13b, 13d, 13f show the gripping members ST in the closed position tightly gripping a storage rod, respectively. The hook-type gripping members HT comprises a pivotable hook mechanism designed to accommodate a round (FIGS. 15a–15b), an oval (FIGS. 15c–15d), and a polygonal storage rod (FIGS. 15e–15f), receptively. FIGS. 15a, 15c, 15e show the gripping members HT in the disengaged position, ready to receive a storage rod 2 or immediately after releasing a storage rod 2. FIGS. 15b, 15d, 15f show the gripping members HT engaging a round, oval or polygonal storage rod 2, respectively. FIGS. 14a–14f show the gripping members ST mounted on a protective plate PP of a transfer unit TU which protects the goods during transport, and FIGS. 16a–16f show the hook-shaped gripping members also on a protective plate PP of a transfer unit TU.

Figure 6:
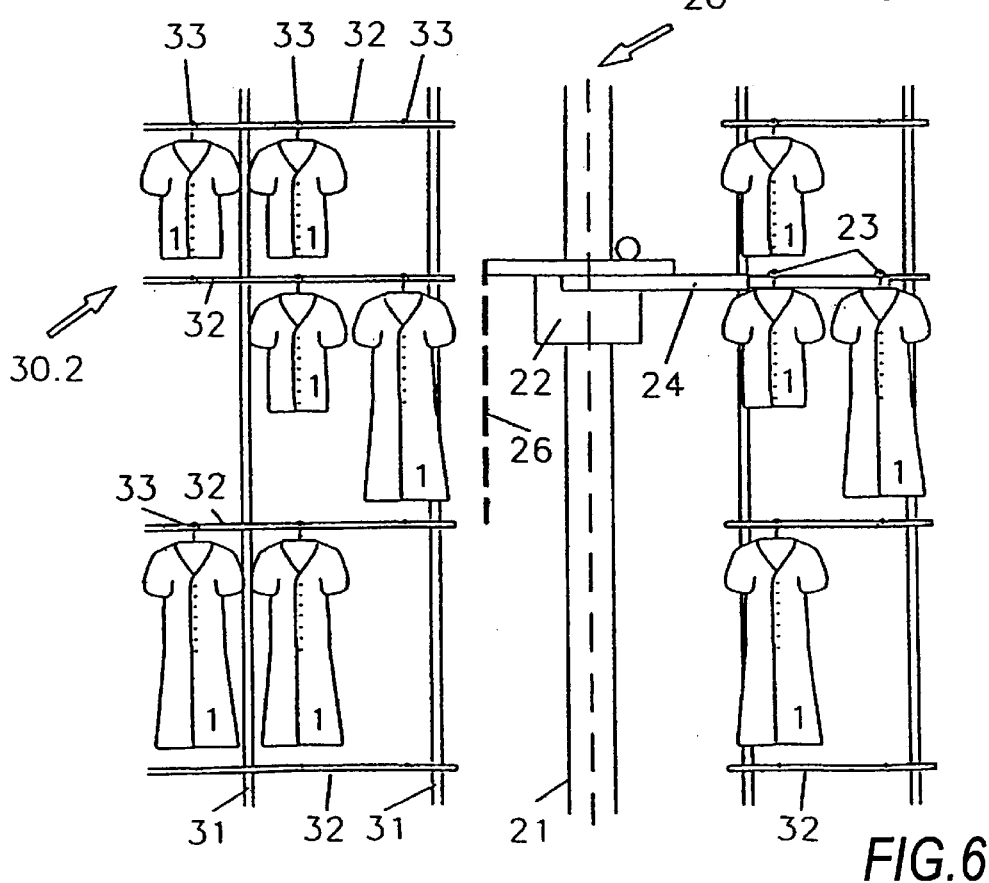
FIG. 6 is a front view of a portion of a two-row storage shelf system for articles of clothing.

FIG. 6 is a front view of a portion of a high storage shelf system with high shelves 30.2 in which the goods 1 are hanging in two rows, one behind the other. Transverse struts 32 are attached to the posts 31, wherein the supports 33 for the storage rods 2 are mounted on the transverse struts 32. The operating device 20 traveling in the aisle is provided with a telescopic cantilever 24 which engages underneath the storage rods 2 and has on its upper side 2 receiving means 23 for a storage rod 2 each. Accordingly, in this embodiment, two storage rods 2 can be moved in and out at the same time.

FIG. 7 shows a portion of a hanging conveyor installation in the area of a transfer station. FIG. 7 shows the rail 11 which is mounted underneath a rail carrier 14. Suspended from the rail 11 is a trolley 12 with a storage rod 2 suspended from the holding device 13, wherein a hanger with an article of clothing 1 hangs from the storage rod 2. Provided at the rail carrier 14 is additionally a positioning and centering device comprised of a pivot drive 15 and a pivot arm 16. The pivot arm 16 is connected to the pivot drive 15 so as to be pivoted about a vertical pivot axis. The pivot arm 16 acts on the trolleys 12 arriving at the transfer station for precisely positioning the trolley 12. The pivot drive 15 is controlled by means of an integrated sensor mechanism, generally known in the art, in the form of switches, light barriers, magnetic initiators, or the like, not shown, for detecting the position of the trolley. Based on the sensor signals of the sensor mechanism, the pivot drive 15 rotates the pivot arm 16 in one or the other direction to thereby push the trolley 12 until it has reached its proper position for the transfer of goods.

Figure 7A:
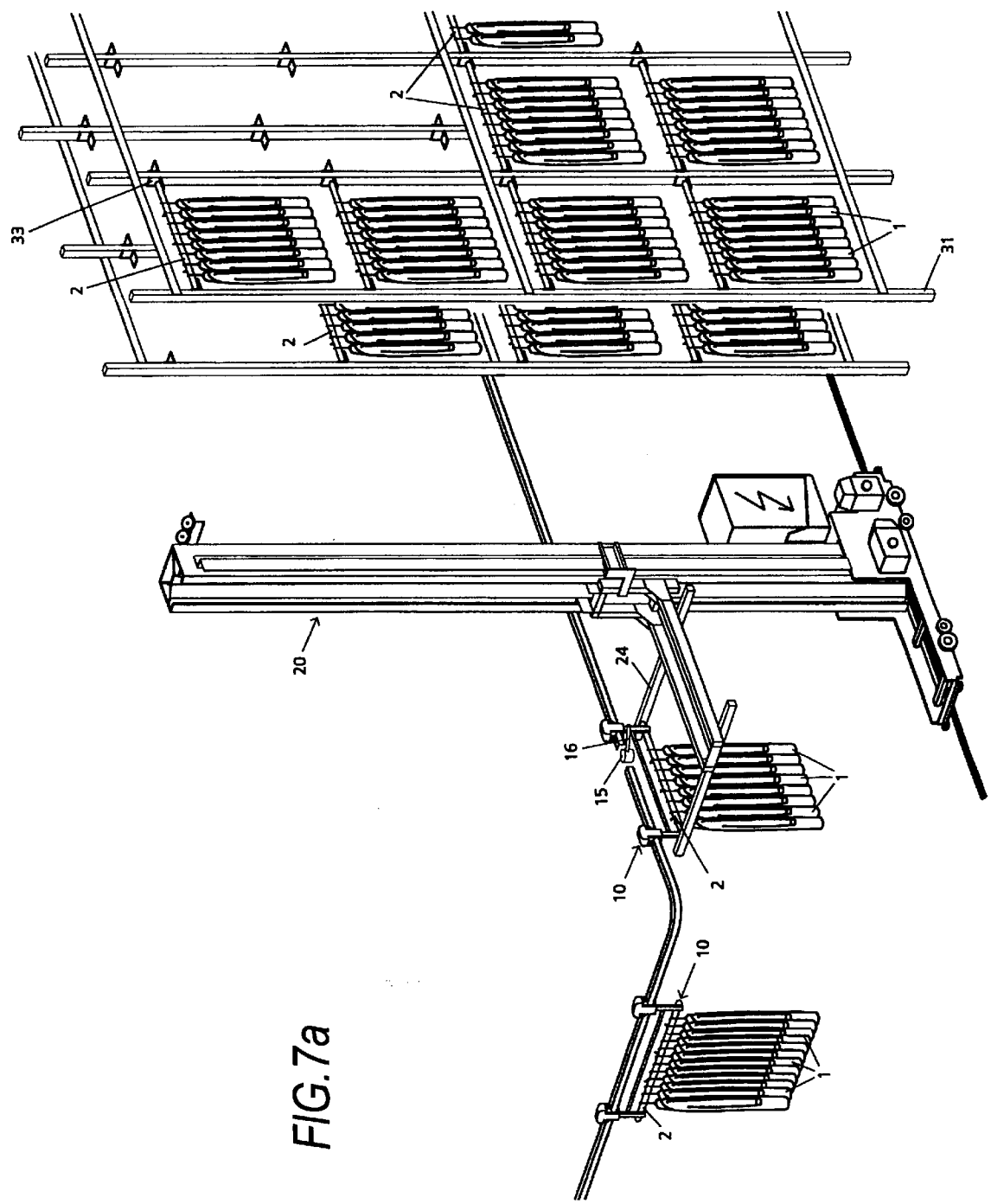
FIG. 7a is a perspective view of a high storage shelf system showing the transfer station interacting with an operating device.

FIG. 7a shows the transfer station of FIG. 7 in interaction with the operating device 20.

Figure 8:
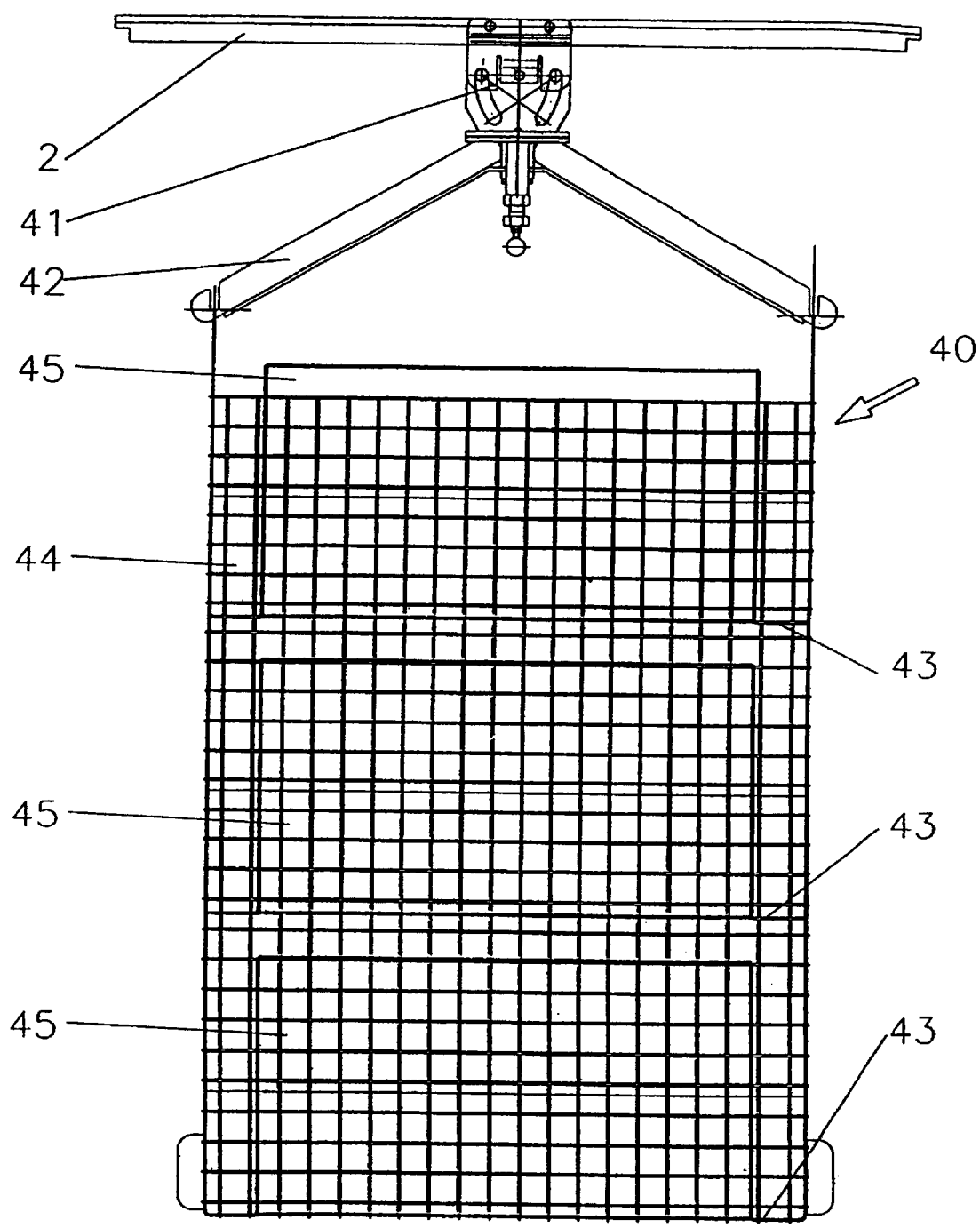
FIG. 8 is a hanging object in the form of a wire mesh box.

FIG. 8 shows, as an example for additional hanging goods, the wire mesh box 40 which is mounted on the storage rod 2 by means of a hanger 42 and a joint 41. The wire mesh box 40 has three storage floors 43 and, thus, can receive goods, for example, cartons 45, on three levels. A swinging door 44 makes it possible to move the goods or cartons 45 in and out.

Figure 9:
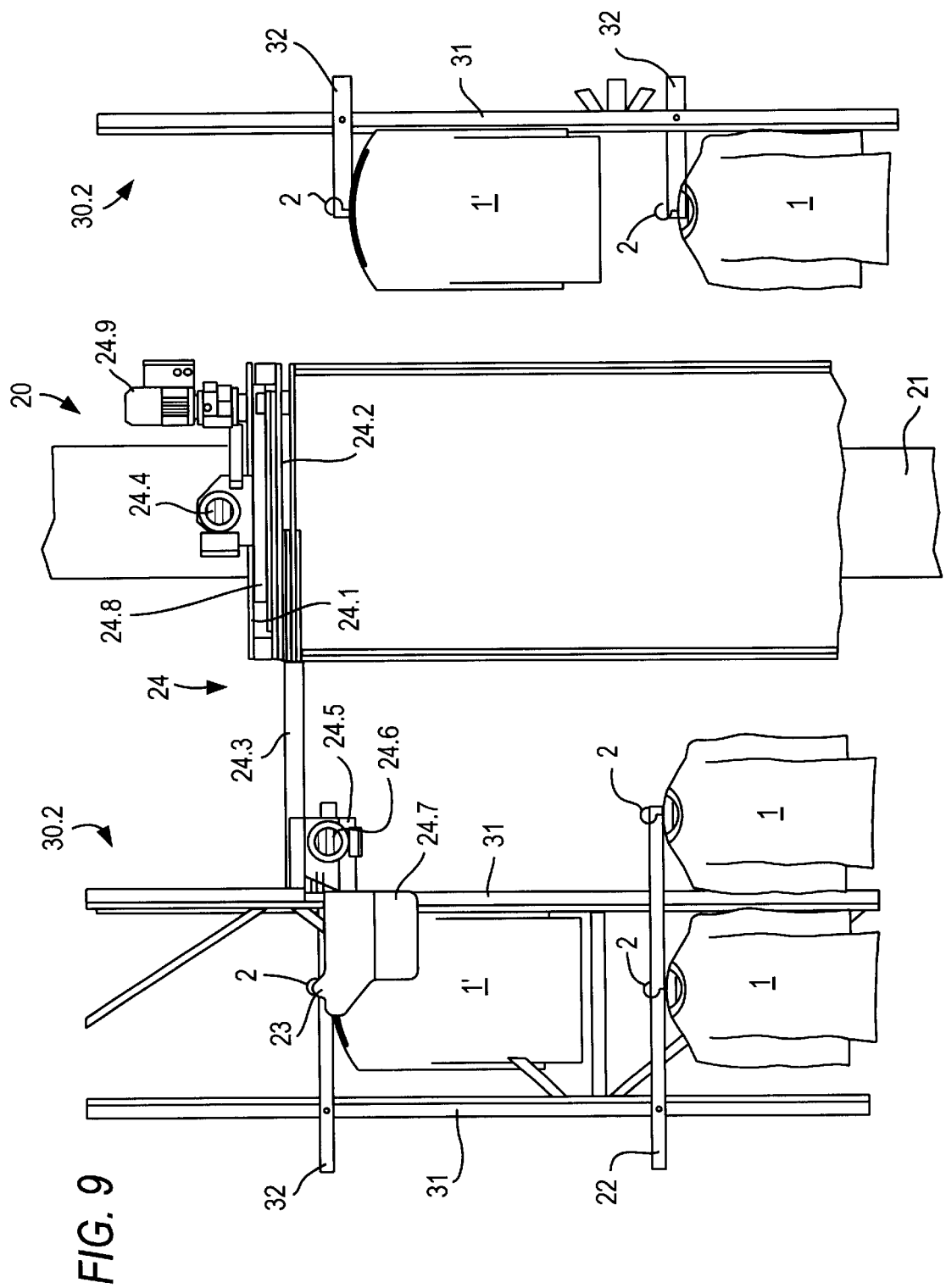
FIG. 9 is a schematic illustration of an operating device with a completely extended telescopic cantilever as it receives a storage rod with goods.

FIG. 9 shows a portion of an operating device 20 in the aisle between two shelves 30.2 in which the goods 1,1' hang in two rows one behind the other. A base plate 24.1 is fastened to the mast 21 of the operating device 20. Provided underneath the base plate 24.1 is a turntable 24.8 which is driven by a motor 24.9. Fastened underneath the turntable 24.8 is a telescopic frame 24.2 on which a double telescopic pull-out 24.3 is mounted. The telescopic pull-out 24.3 is driven by means of a drive motor 24.4.

Figures 12A, 12B, 12C:
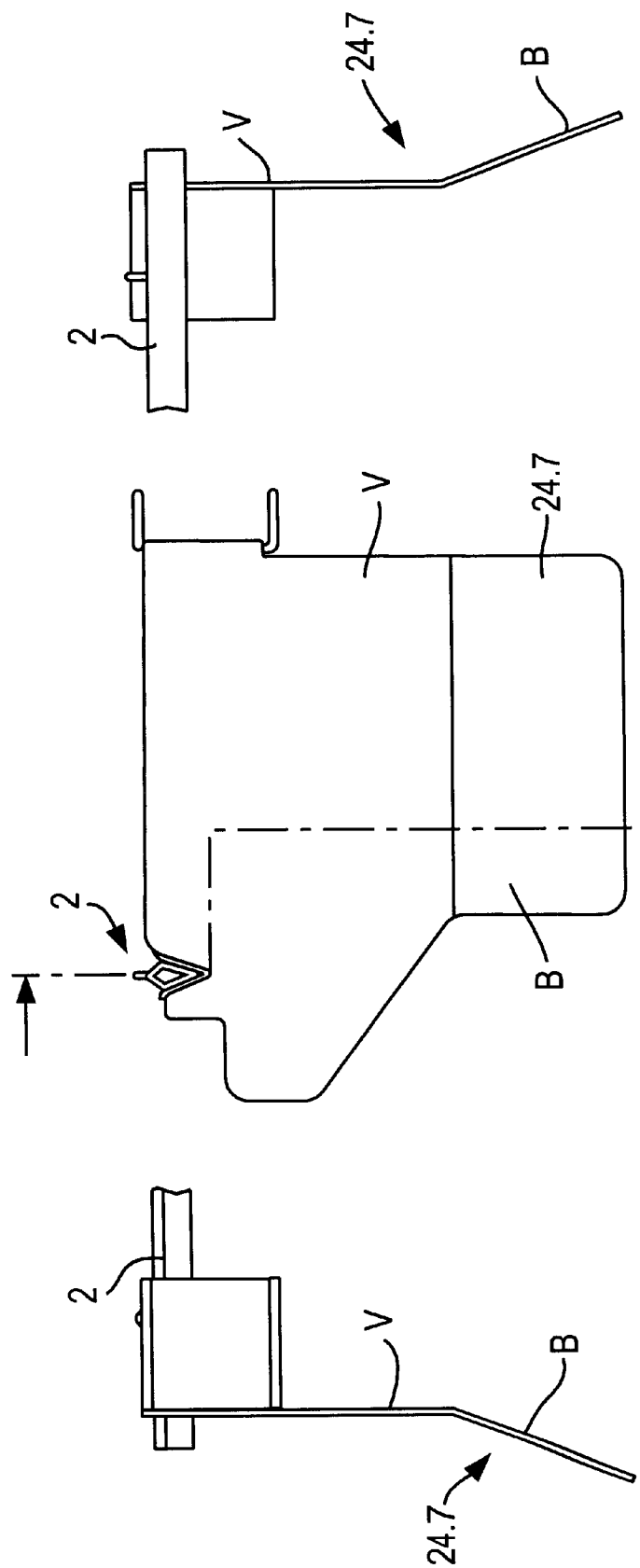

Mounted underneath the telescopic pull-out 24.3 is a separately moveable transfer unit 24.5 which is moved by a drive motor 24.6. A centering plate 24.7 each is fastened at the right and left of the transfer unit 24.5. These centering plates 24.7 (see FIGS. 12a–12c for a detailed view) extend perpendicularly to the storage rod 2 and parallel to the goods 1' and are comprised of a vertical portion V and a bent or angled portion B such that they converge downwardly and toward one another to form a type of funnel narrowing from the storage rod in the downward direction for centering and supporting the goods 1,1' hanging from the storage rod 2. The device 23 for holding the storage rod 2 is provided at the upper edge of the centering plates 24.7.

As soon as the storage rod 2 with the goods 1' suspended therefrom hangs on the centering plates 24.7, the double telescopic pull-out 24.3 is pulled back again. Simultaneously, the separately moveable transfer unit 24.5 is also moved back until the storage rod 2 with the goods 1' suspended therefrom is located in the middle of the operating device 20 where it has the optimum distance from the two shelves 30.2 with the goods 1,1' stored therein.

Figure 17B:
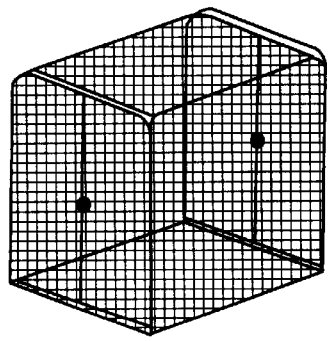
Figure 17C:
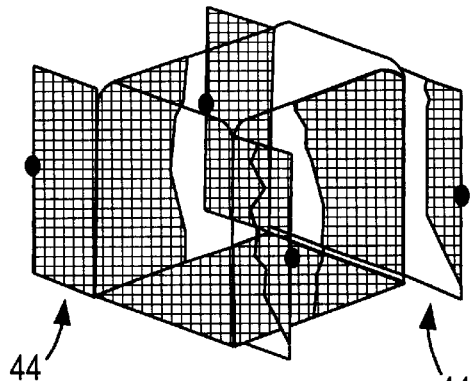
Figure 17A:
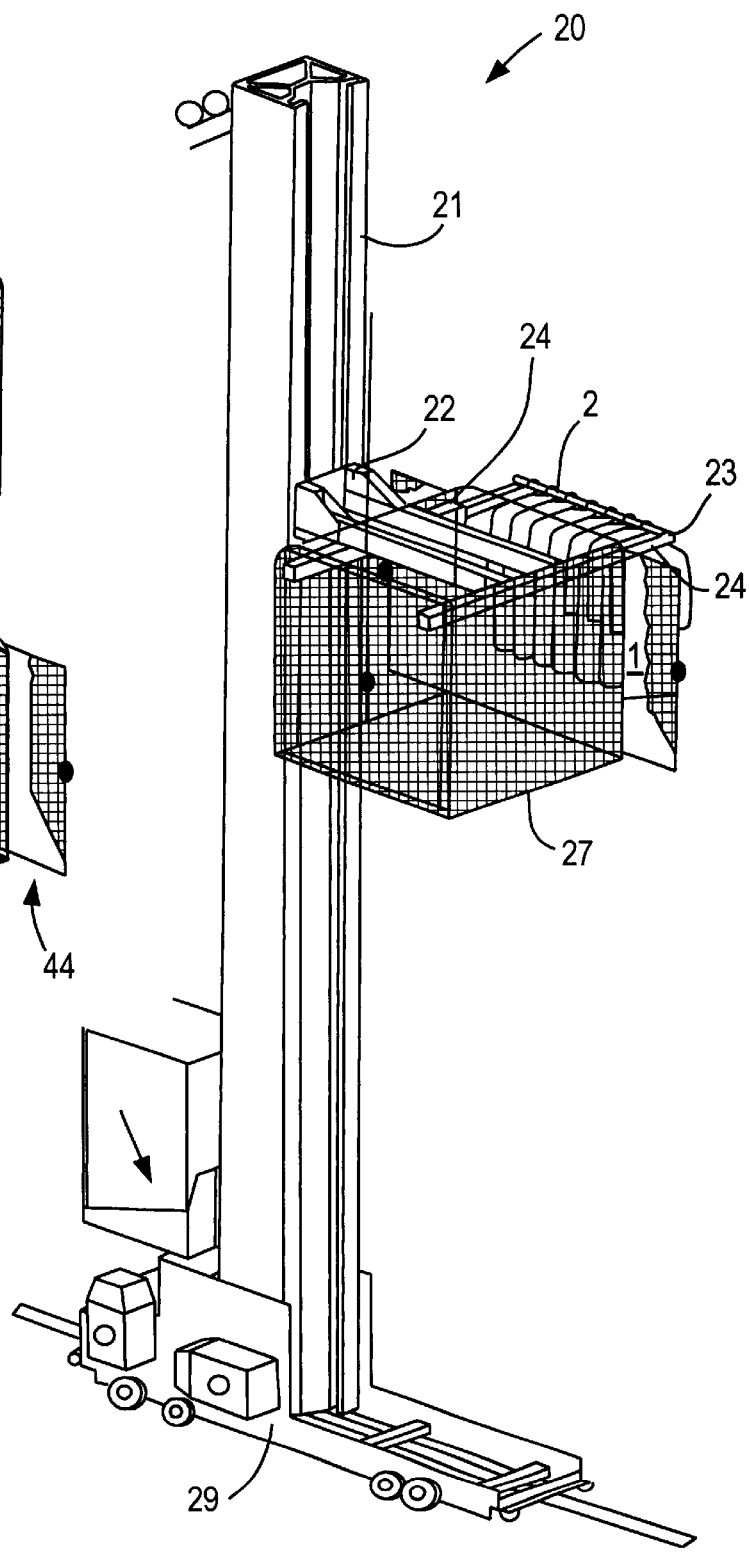

A protective device for securing the pieces of clothing during movement in the form of a wire mesh box (27, 44) with swinging doors 44 is shown in FIGS. 17a–17c. FIG. 17a shows the mesh box 27, 44 being moved by a an operating device 20 comprising an undercarriage 21, a mast 22, and a lifting carriage 22 with telescoping arms 24 and supports 23. The swinging doors 44 of the mesh box are open at one side for the mesh box to receive groods from or unload goods onto a shelf storage unit (not shown). The detail views FIG. 17b and FIG. 17c show the swinging door closed and open, respectively.

FIG. 18a shows in an illustration similar to that of FIG. 17a the protective mesh box 27, 44a, 44b with sliding shutters 44a moveable on schematically illustrated guides 44b in the open position for loading or unloading goods. FIG. 18b shows the shutters 44a closed, and FIG. 18c shows the shutters 44a moved along the guides 44b into the open position.

Figure 19A:
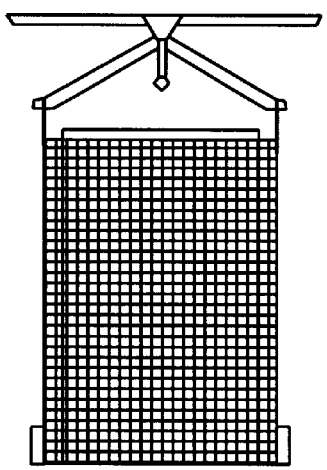
Figure 19B:
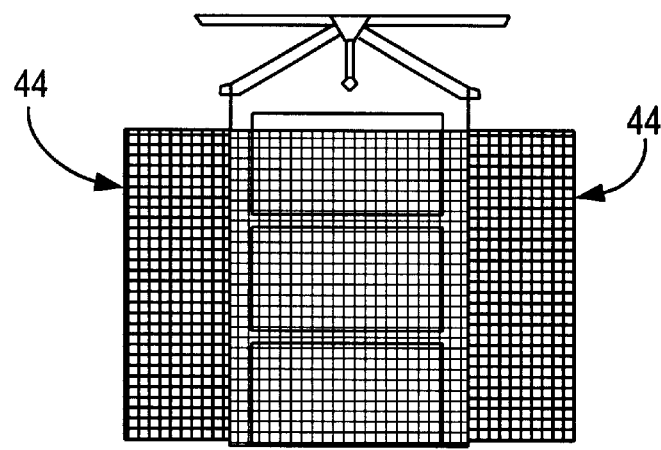

FIGS. 19a–19b correspond to the representation of FIG. 8 and illustrates the swinging doors 44 in more detail, wherein FIG. 19a shows the doors closed and FIG. 19b shows the doors open.

While specific embodiments of the invention have been shown and described in detail to illustrate the inventive principles, it will be understood that the invention may be embodied otherwise without departing from such principles.

We claim:

1. A high storage shelf system for hanging goods, comprising a hanging conveyor of the power-and-free type with trolleys traveling on rails, a storage unit, operating devices for loading and unloading the storage unit, and storage rods having hanging goods suspended therefrom for transport and storage of the hanging goods, wherein the trolleys transport the storage rods to and from the operating devices, wherein the operating devices remove the storage rods from the trolleys and transport the storage rods to the storage unit for loading the storage unit and remove the storage rods from the storage unit and transfer the storage rods to the trolleys for unloading the storage unit, wherein the trolleys, the operating devices and the storage unit comprise supports.

2. The storage shelf system according to claim 1, wherein the storage rods are comprised of pipes having a round or oval cross-section.

3. The storage shelf system according to claim 1, wherein the storage rods are comprised of pipes having a polygonal cross-section.

4. The storage shelf system according to claim 1, wherein each storage rod comprises at least one stopper for preventing sliding of the hanging goods in a longitudinal direction of the storage rod.

5. The storage shelf system according to claim 1, wherein the supports are comprised of U-shaped or V-shaped prisms.

6. The storage shelf system according to claim 1, wherein the storage units comprise posts, wherein the supports are directly fastened to the posts.

7. The storage shelf system according to claim 1, wherein the storage unit is comprised of posts and transverse struts connecting the posts, wherein the supports are fastened to at least one of the posts and the transverse struts.

8. The storage shelf system according to claim 1, wherein two or more of the supports are arranged one behind the other on a storage level.

9. The storage shelf system according to claim 1, further comprising transfer stations where the storage rods are transferred between the trolleys and the operating devices, wherein the transfer stations comprise positioning and centering devices for precisely positioning the trolleys at the transfer stations for ensuring proper transfer of the storage rods between the trolleys and the operating devices.

10. The storage shelf system according to claim 9, wherein the positioning and centering devices comprise devices for moving, positioning and securing the trolleys at the transfer stations.

11. The storage shelf system according to claim 10, wherein the transfer stations comprise side shields and protective plates, wherein the positioning and centering devices have an integrated sensor system for controlling fine positioning of the trolleys.

12. The storage shelf system according to claim 1, wherein the means for loading and unloading of each operating device comprises at least one telescopic cantilever, and at least one device for holding one of the storage rods mounted at the telescopic cantilever.

13. The storage shelf system according to claim 12, wherein the telescopic cantilever is comprised of a base plate, a telescopic frame mounted underneath the base plate, a single or double telescopic pull-out mounted on the telescopic frame, a separately moveable transfer unit mounted on the telescopic pull-out, wherein the device for holding a storage rod is mounted on the telescopic pull-out, further comprising a first drive motor for driving the telescopic pull-out and a second drive motor for driving the transfer unit.

14. The storage shelf system according to claim 13, further comprising a turntable mounted between the base plate and the telescopic frame, and a third drive motor for rotating the turntable.

15. The storage shelf system according to claim 13, further comprising centering plates mounted on both sides of the transfer unit, wherein the centering plates converge in a downward direction and toward one another, and wherein the device for holding a storage rod is mounted on the centering plates.

16. The storage shelf system according to claim 12, wherein the telescopic cantilever is comprised of a flat telescopic plate configured to travel over the storage rods, and wherein the supports are gripping members comprised of a hook mechanism or a scissor mechanism.

17. The storage shelf system according to claim 12, wherein each operating device comprises a holding and protecting device for protecting the hanging goods during travel, wherein the holding and securing device further comprises a shutter, a sliding or swinging door or a protective mesh.

18. The storage shelf system according to claim 12, wherein each operating device comprises at least two telescopic cantilevers.

19. The storage shelf system according to claim 1, wherein each storage rod comprises a joint, a wire mesh box suspended from the joint, wherein the wire mesh box comprises storage floors and a folding door.

20. The storage shelf system according to claim 19, wherein each operating device comprises at least two telescopic cantilevers configured to travel into a position underneath the wire mesh box so that the wire mesh box is supported on the at least two cantilevers when the wire mesh box is transferred onto the trolleys or the storage unit in order to prevent swinging of the wire mesh box.

* * * * *